US012258923B2

(12) United States Patent
Malkus et al.

(10) Patent No.: US 12,258,923 B2
(45) Date of Patent: Mar. 25, 2025

(54) COWL ASSEMBLY FOR A PROPULSOR

(71) Applicant: General Electric Company, Schenectady, NY (US)

(72) Inventors: Thomas Malkus, Albany, NY (US); Trevor Howard Wood, Clifton Park, NY (US); Kishore Ramakrishnan, Rexford, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/182,613

(22) Filed: Mar. 13, 2023

(65) Prior Publication Data

US 2024/0309828 A1 Sep. 19, 2024

(51) Int. Cl.
  *F02K 1/09* (2006.01)
  *F02K 1/06* (2006.01)
(52) U.S. Cl.
  CPC ..................... *F02K 1/06* (2013.01)
(58) Field of Classification Search
  CPC ..................... F02K 1/06; F02K 1/09
  See application file for complete search history.

(56) References Cited

U.S. PATENT DOCUMENTS

| | | | |
|---|---|---|---|
| 3,779,010 A * | 12/1973 | Chamay | F02K 1/72 239/265.31 |
| 3,820,719 A * | 6/1974 | Clark | F02K 1/09 239/265.31 |
| 8,104,261 B2 * | 1/2012 | Marshall | F02K 1/09 239/265.33 |
| 8,505,307 B2 * | 8/2013 | Wang | F02K 1/763 244/110 B |
| 8,984,891 B2 | 3/2015 | Lariviere et al. | |
| 8,997,497 B2 | 4/2015 | Hall et al. | |
| 9,394,852 B2 | 7/2016 | Atassi et al. | |
| 9,494,084 B2 | 11/2016 | Kohlenberg et al. | |
| 9,617,954 B2 | 4/2017 | Vuillemin et al. | |
| 9,777,671 B2 | 10/2017 | Ramlaoui et al. | |
| 9,863,366 B2 | 1/2018 | Froemming et al. | |
| 10,077,739 B2 * | 9/2018 | James | F02K 1/763 |

(Continued)

OTHER PUBLICATIONS

Michel, The Benefits of Variable Area Fan Nozzles on Turbofan Engines, 49th AIAA Aerospace Sciences Meeting Including the New Horizons Forum and Aerospace Exposition, AIAA-2011-226, Orlando Florida, Jan. 4-7, 2011, 17 Pages. (Abstract Only) https://arc.aiaa.org/doi/10.2514/6.2011-226.

*Primary Examiner* — Kayla Mccaffrey
(74) *Attorney, Agent, or Firm* — Dority & Manning, P.A.

(57) ABSTRACT

A propulsor is provided having a power source; a fan section coupled to the power source and configured to provide thrust opposite a downstream direction; and a cowl assembly at least partially enclosing the power source and the fan section, the cowl assembly including: a forward cowl component; a first aft cowl component disposed in the downstream direction relative to the forward cowl component and movable to vary a first aft cowl displacement from the forward cowl component in the downstream direction; and a second aft cowl component disposed in the downstream direction relative to the first aft cowl component and movable to vary a second aft cowl intermediate displacement from the first aft cowl component.

11 Claims, 9 Drawing Sheets

(56) References Cited

U.S. PATENT DOCUMENTS

| | | |
|---|---|---|
| 10,087,885 B2 | 10/2018 | Kohlenberg et al. |
| 10,975,804 B2 | 4/2021 | Buey et al. |
| 2021/0285397 A1 | 9/2021 | Kohlenberg et al. |

* cited by examiner

COWL ASSEMBLY FOR A PROPULSOR

FIELD

The present disclosure generally relates to a gas turbine engine and, more particularly, to a cowl assembly with variable nozzle features.

BACKGROUND

A gas turbine engine generally includes a fan and a turbomachine arranged in flow communication with one another. The turbomachine of the gas turbine engine includes, in serial flow order, a compressor section, a combustion section, a turbine section, and an exhaust section. In operation, air is provided from the fan to an inlet of the compressor section where one or more axial compressors progressively compress the air until it reaches the combustion section to provide combustion gases. The combustion gases are routed from the combustion section to the turbine section. The flow of combustion gasses through the turbine section drives the turbine section and is then routed through the nozzle section and to the atmosphere.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
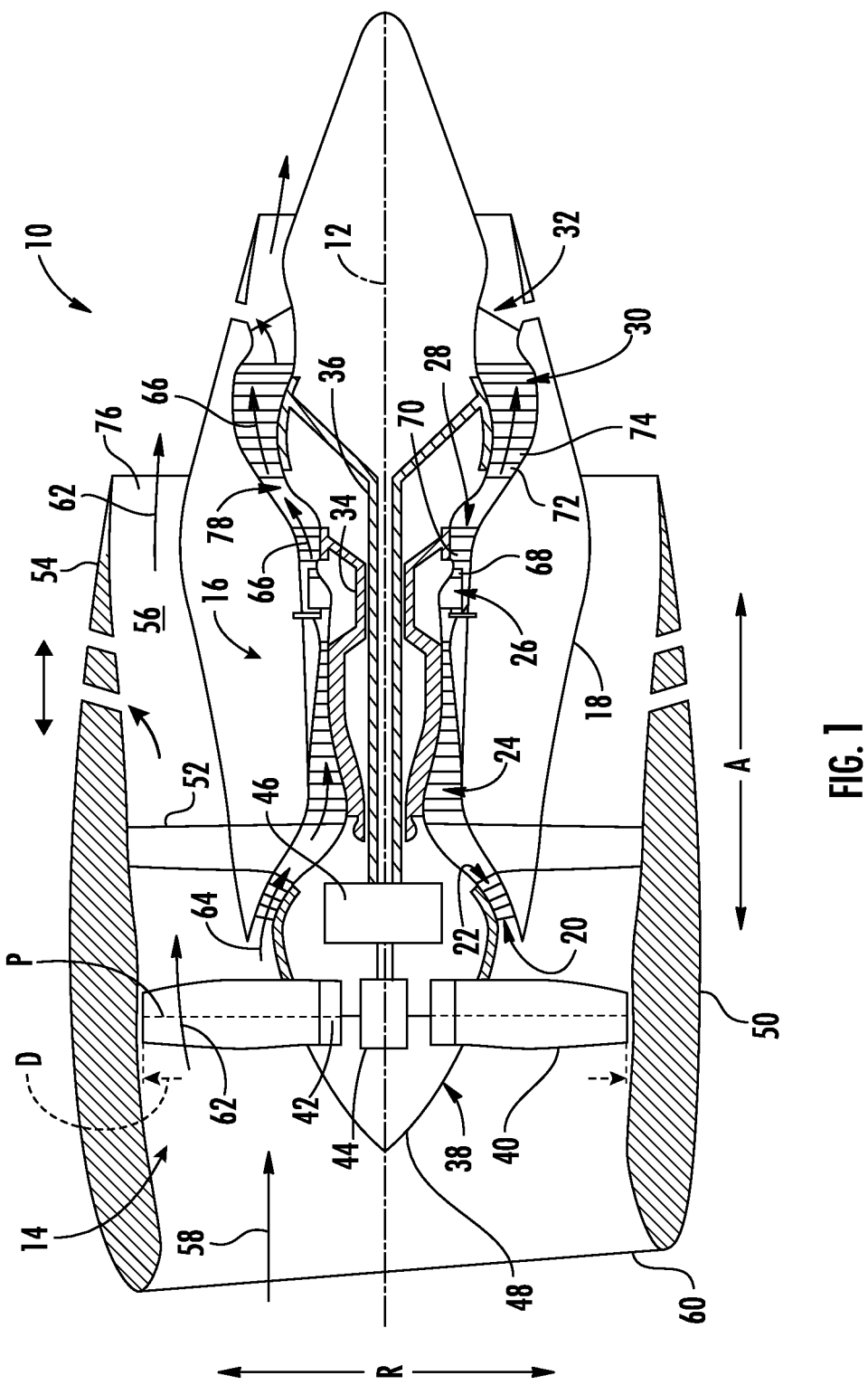
FIG. 1 is a schematic sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low pressure turbine" or "low speed turbine" defines a component configured to operate at a rotational speed, such as a maximum allowable rotational speed, lower than a "high pressure turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As may be used herein, the terms "axial" and "axially" refer to directions and orientations that extend substantially parallel to a centerline of the gas turbine engine. Moreover, as may be used herein, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

An aerodynamic device configured to produce lift or thrust or be a part of a propulsor that produces lift of thrust is provided. The aerodynamic device defines a thickness direction and includes a cowl assembly that may define at least in part an airflow stream and may include a forward cowl and an aft cowl. At least one of the forward cowl or the aft cowl may be moveable to open a flow passage in a deployed or open position and may be moveable to close the flow passage in a stowed or closed position.

For example, the aerodynamic device may be a variable area fan nozzle of a gas turbine engine. More particularly, during an operating condition of the gas turbine engine, a cowl assembly e.g., translating cowl, of the variable area fan nozzle may have a closed configuration and one or more open configurations, representing tuned positions for operation of a fan of the gas turbine engine during various operating conditions of the gas turbine engine. Particularly with fixed pitch fans, a relatively large degree of nozzle tuning range is desirable. In a closed configuration, components may generally be resistant to external forces. However, when components are spaced apart to achieve an open configuration, reductions in stiffness and exposure to greater aerodynamic forces may result in undesirable vibrations such as flutter. Often, components would need to be sized and shaped for strength to control such vibrations, leading to heavy and large components. It is an objective of the present disclosure to provide a solution that relies on relatively small and lightweight components to achieve the desired changes in effective nozzle area while avoiding flutter.

Referring now to the drawings, wherein identical numerals indicate the same elements throughout the figures, FIG. 1 is a schematic cross-sectional view of a propulsor, and more specifically of a gas turbine engine for the embodiment shown, in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan engine 10 includes a fan section 14 and a power source disposed downstream from the fan section 14. In the embodiment depicted, the power source is a turbomachine 16 of the turbofan engine 10.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a fan 38 having a plurality of fan blades 40 coupled to a disk 42 in a spaced apart manner and defining a fan diameter D along the radial direction R. As depicted, the fan blades 40 extend outwardly from disk 42 generally along the radial direction R. It should be appreciated that in the exemplary embodiment depicted, the fan 38 is configured as a variable pitch fan 38. The fan may be driven directly by LP shaft 36 or through a power gearbox 46. However, the variable pitch fan 38 is provided by way of example only. In alternative embodiments, the fan may be a fixed pitched fan (direct or geared) or any other suitable fan. Each fan blade 40 is rotatable relative to the disk 42 about a pitch axis P by virtue of the fan blades 40 being operatively coupled to a suitable actuation member 44 configured to vary the pitch of the fan blades 40. The fan blades 40, disk 42, and actuation member 44 are together rotatable about the longitudinal centerline 12 by LP shaft 36 across the power gearbox 46. The power gearbox 46 includes a plurality of gears for stepping down the rotational speed of the LP shaft 36 to a more efficient rotational fan speed.

Referring still to the exemplary embodiment of FIG. 1, the disk 42 is covered by a rotatable front spinner 48 aerodynamically contoured to promote an airflow through the plurality of fan blades 40. Additionally, the exemplary fan section 14 includes a cowl assembly or outer nacelle 50 that circumferentially surrounds the fan 38 and/or at least a portion of the turbomachine 16. It should be appreciated that the nacelle 50 may be configured to be supported relative to the turbomachine 16 by a plurality of circumferentially-spaced outlet guide vanes 52. Moreover, a downstream section 54 of the nacelle 50 may extend over an outer portion of the turbomachine 16 so as to define a bypass airflow passage 56 therebetween. Additionally, the nacelle 50 may be moveable between a deployed and a stowed position. In particular, at least a portion of the downstream section 54 may be configured to translate along the axial direction A, as will be described in more detail below, to open up one or more flow passages and to facilitate air to flow therethrough. In such a manner, the downstream section 54 of the nacelle 50 may be referred to as a translating cowl assembly, i.e., translating cowl of a variable area exhaust nozzle.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air 58, as indicated by arrows 62, is directed or routed into the bypass airflow passage 56 and a second portion of the air 58, as indicated by arrow 64, is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 via sequential stage of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. For example, as noted, the turbofan engine 10 includes a translating cowl of a variable area exhaust nozzle. In additional or alternative embodiments, the turbofan engine 10 may include any other suitable cowl assembly that is moveable to open one or more flow passages in a deployed position and moveable to close the one or more flow passages in the closed position. As used herein, the term "cowl assembly" refers generally to aerodynamic components of an aerodynamic device configured to direct an airflow to assist the aerodynamic device in producing lift or thrust. The cowl assembly may therefore be configured as part of a variable flow nozzle, an exhaust nozzle, a supersonic inlet, a wing, or the like. For example, the turbofan engine 10 (or other suitable gas turbine engine) may include an inlet of a supersonic aircraft engine configured to translate between a deployed position and a closed position, a translating cowl of a mixed flow exhaust nozzle configured to translate between a deployed position and a stowed position, etc.

Figure 2:
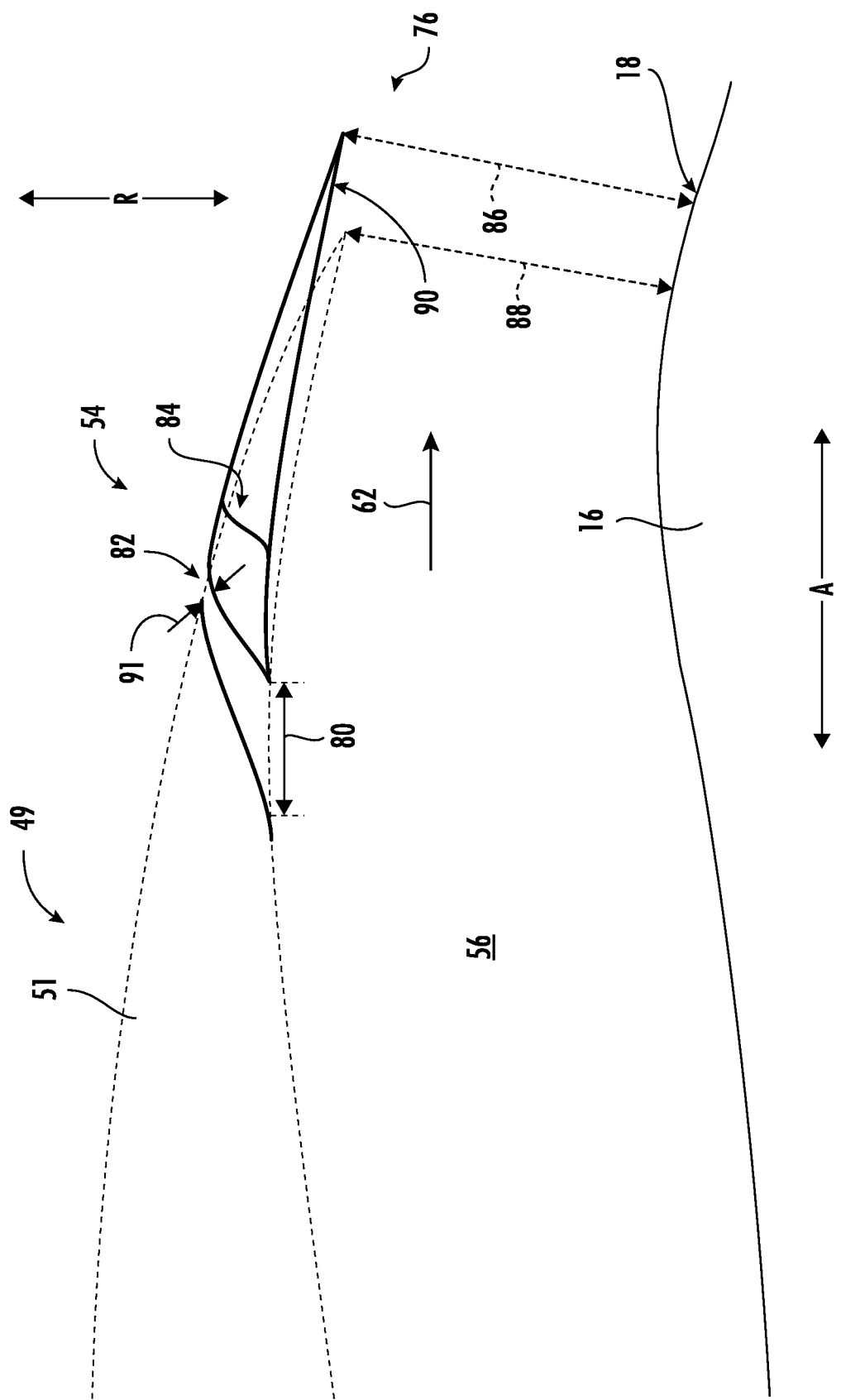
FIG. 2 is a close-up schematic sectional view of a cowl assembly for a gas turbine engine according to an embodiment.

Referring now to FIG. 2, a close-up, sectional depiction of a cowl assembly 49 is provided. As shown in FIG. 2, the cowl assembly 49 is generally configured as a nacelle assembly having a forward cowl component 51 and a downstream section 54 (e.g., an aft nacelle). As depicted, the forward cowl component 51 and the downstream section 54 are spaced apart by a stroke 80. In this depicted configuration, the cowl assembly is in an open configuration. In the open configuration, a first aerodynamic slot 82 is defined between the forward cowl component 51 and the downstream section 54. The first aerodynamic slot 82 facilitates flow to outside of the cowl assembly 49 from a bypass airflow passage 56. A first slot flow area 91 may be defined as a minimum cross-sectional area of the first aerodynamic slot 82 (i.e. an annular area).

As indicated in dashed lines defining the forward cowl component 51 in FIG. 2, the forward cowl component 51 and the downstream section 54 are movable towards each other by a distance defined by the stroke 80 into a closed configuration. Relative to the open configuration, the closed configuration has a shorter axial extent, for example by an amount approximate to the amount of the stroke 80. Additionally, the cowl assembly 49 of FIG. 2 has an open, or maximum nozzle area 86 in the open configuration that is greater than a closed, or minimum nozzle area 88 in the closed configuration. The maximum nozzle area 86 and the minimum nozzle area 88 represent different cross-sectional (e.g., annular) areas defined between an outer nozzle surface 90 of the downstream section 54 and an outer casing surface 18 of a turbomachine 16 that controls a first portion of air 62 through the bypass airflow passage 56 and out of a fan nozzle exhaust section 76.

The embodiment of FIG. 2 relies on the stroke 80 of the downstream section 54 relative to the forward cowl component 51 to move between its maximum nozzle area 86 and its minimum nozzle area 88. As briefly discussed above, it may be beneficial to increase a maximum amount of change in nozzle area, given constraints on displacement such as resistance to flutter. Further, a maximum change in nozzle area may be limited by a maximum single opening size defined by an aerodynamic stall point or loss of thrust if aerodynamic surfaces on the downstream section 54 are displaced too far from aerodynamic surfaces on the forward cowl component 51. Particularly as certain turbine engine designs trend towards fixed pitch, low fan pressure ratio assemblies, there is a need to provide a greater range of nozzle areas in a lightweight and efficient package. Such a need may be satisfied according to the present disclosure, for example by inclusion of a second aerodynamic slot 84 in the downstream section 54 (indicated as a line in FIG. 2 to depict the second aerodynamic slot 84 being in a closed position; in which case the stroke 80 may not be limited to a movement of the downstream section 54 exposing just the first aerodynamic slot 82), which will be explained in more detail below with reference to the embodiment of FIG. 3. For example, FIG. 2 may represent a partially deployed configuration of FIG. 3, particularly with sequential opening as described below.

Figure 3:
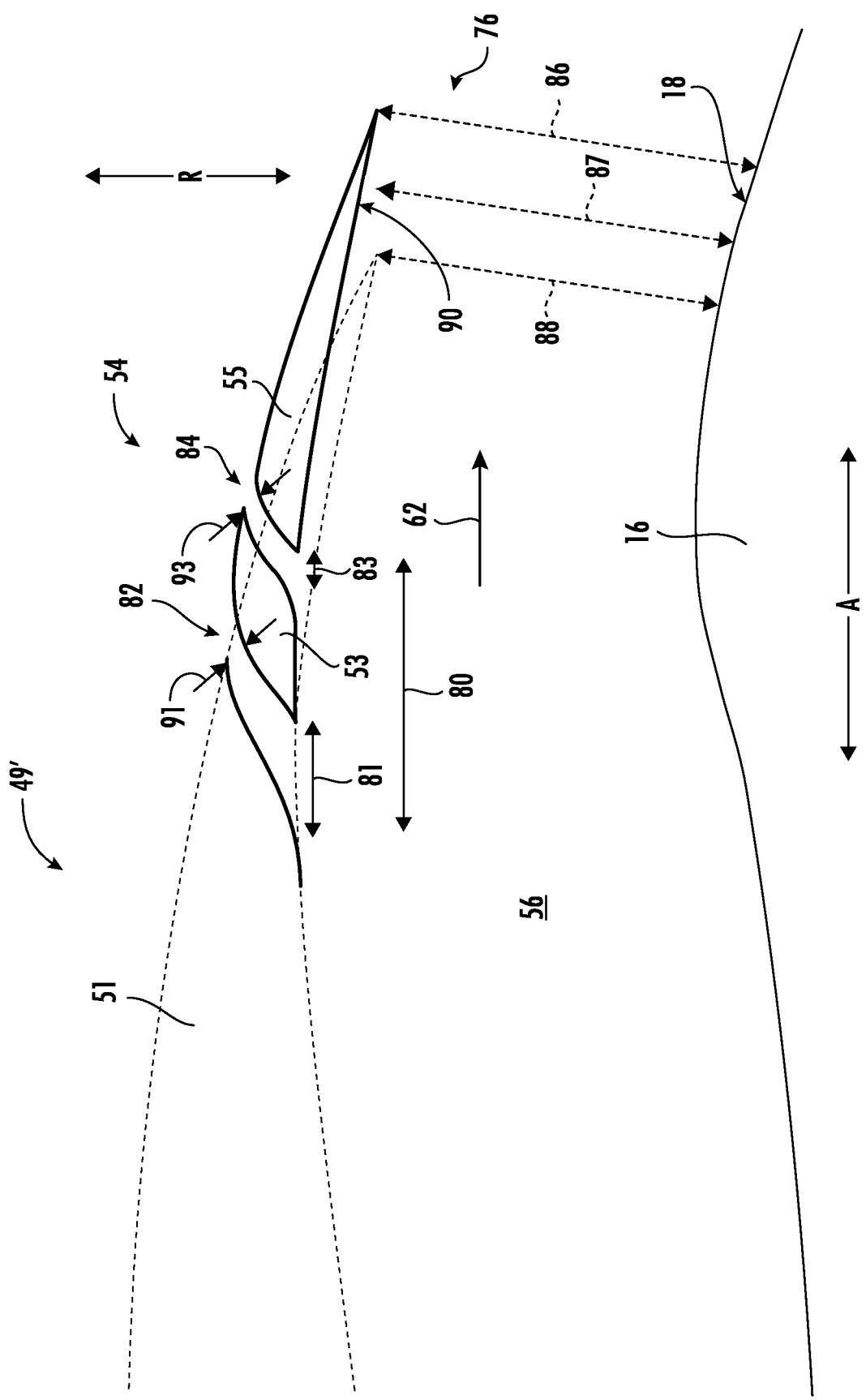
FIG. 3 is a close-up schematic sectional view of a cowl assembly for a gas turbine engine according to another embodiment.

Turning now to FIG. 3, a close-up, sectional view of a cowl assembly 49' that may be incorporated into the gas turbine engine 10 of FIG. 1, according to the present disclosure is provided. The cowl assembly 49' is similar to the cowl assembly 49 of FIG. 2. Therefore, like parts will be identified with like numerals, with it being understood that the description of the like parts of the cowl assembly 49 of FIG. 2 applies to the cowl assembly 49' unless otherwise noted. As shown, the cowl assembly 49' may generally be radially disposed around a turbomachine 16 and includes a nacelle (similar to the nacelle 50 in FIG. 1) including a downstream section 54. The embodiment of FIG. 3 provides a forward cowl component 51, a first aft cowl component 53, and a second aft cowl component 55. The first aft cowl component 53 and the second aft cowl component 55 may be collectively referred to as the downstream section 54. As depicted in the dashed line of the forward cowl component 51 in FIG. 3, the downstream section 54 and the forward cowl component 51 may generally be movable relative to one another from a closed configuration, as depicted in the dashed line, to one or more open configurations.

Specifically, the first aft cowl component 53 may be disposed downstream along the axial direction A (also referred to as being disposed in a downstream direction) relative to the forward cowl component 51. The first aft cowl component 53 may then be movable at least partially in the axial direction A to vary a first aft cowl displacement 81 between the forward cowl component 51 and the first aft cowl component 53. The first aft cowl displacement 81 may also be referred to as a first aft cowl component stroke as discussed in greater detail just below. The second aft cowl component 55 may be disposed downstream along the axial direction A (or in the downstream direction) relative to the first aft cowl component 53. The second aft cowl component 55 may be independently movable from the first aft cowl component 53 and the forward cowl component 51 such that a second aft cowl displacement 80 from the forward cowl component 51 is defined and a second aft cowl intermediate displacement 83 from the first aft cowl component 53 is defined. The second aft cowl intermediate displacement 83 may also be referred to as a second aft cowl component stroke, as discussed in greater detail just below. A sum of the first aft cowl displacement 81 and the second aft cowl intermediate displacement 83 may be collectively referred to as a total stroke.

As above, the first aft cowl displacement 81 generally represents a movement of the first aft cowl component 53 relative to the forward cowl component 51. The first aft cowl displacement 81 indicated in FIG. 3 may generally represent a maximum displacement or maximum first aft cowl stroke. It should be appreciated that, as indicated in the dashed lines of the forward cowl component 51 in FIG. 3, a minimum displacement or minimum first aft cowl stroke may be zero or approximately zero accounting for mechanical tolerances. It should also be appreciated that a non-zero minimum displacement may also be selected.

Still referring to FIG. 3, the second aft cowl intermediate displacement 83 generally represents a movement of the second aft cowl component 55 relative to the first aft cowl component 53. The second aft cowl intermediate displacement 83 as indicated in FIG. 3 may generally represent a maximum displacement or maximum second aft cowl stroke. It should be appreciated that, as indicated in the dashed lines of the forward cowl component 51 in FIG. 3, a minimum displacement or minimum second aft cowl stroke may be zero or approximately zero accounting for mechanical tolerances. It should also be appreciated that a non-zero minimum displacement may also be selected.

In FIG. 3, a minimum of the total stroke, as indicated by the dashed line of the forward cowl component 51, may be used to define a minimum nozzle area 88. Conversely, at a maximum of the total stroke, as indicated by the full extension of the first aft cowl component 53 and the second aft cowl component 55 depicted in FIG. 3, a maximum nozzle area 86 is defined. The nozzle areas as discussed herein are defined between the outer casing 18 of the turbomachine and an outer nozzle surface 90 of the downstream section 54, for example as integrated with the second aft cowl component 55 in FIG. 3. As will be discussed in greater detail below with reference to FIG. 5, various relationships between the minimum nozzle area 88 and the maximum nozzle area 86 are achievable through the total stroke, where generally total stroke and nozzle area are directly proportional in a linear or non-linear manner. Furthermore, at least one intermediate nozzle area 87 may be defined between the minimum nozzle area 88 and the maximum nozzle area 86, corresponding to a total stroke of between the minimum total stroke and the maximum total stroke.

Still referring to FIG. 3, an intermediate total stroke, for example to achieve the intermediate nozzle area 87 identified between the drawn and dashed configurations of FIG. 3, may be achieved by partial stroke of one or more of the first aft cowl component 53 or the second aft cowl component 55, maximum stroke of the first aft cowl component 53, or maximum stroke of the second aft cowl component 55. In the case of maximum stroke of one component of the downstream section 54, it should be appreciated that at least one other component of the downstream section 54 must maintain a minimum or intermediate stroke to achieve the intermediate nozzle area 87. It should further be appreciated that an infinite number of intermediate nozzle areas including the intermediate nozzle area 87 may be provided between the maximum nozzle area 86 and the minimum nozzle area 88.

Movement of the first aft cowl component 53 relative to the forward cowl component 51 may occur independently from movement of the second aft cowl component 55 relative to the forward cowl component 51. For example, in certain embodiments, the first aft cowl component 53 may begin its movement in the downstream direction prior to the second aft cowl component 55 beginning its movement in the downstream direction during movement from a closed operating configuration to an open operating configuration. The second aft cowl component 55 may be configured to move opposite the downstream direction to the closed operating configuration preferentially before the first aft cowl component 53 begins its movement opposite the downstream direction. It is contemplated that any combination of synchronous or sequential movement between operating configurations of the first aft cowl component 53 and the second aft cowl component 55 may be employed.

FIG. 3 further provides a first aerodynamic slot 82 defined between the forward cowl component 51 and the first aft cowl component 53 and a second aerodynamic slot 84 disposed between the first aft cowl component 53 and the second aft cowl component 55. It should be appreciated that the first aerodynamic slot 82 and the second aerodynamic slot 84 may only be open in certain operating configurations and may further be opened or closed independently of one another. The first aerodynamic slot 82 defines a first slot flow area 91 and the second aerodynamic slot 84 defines a second slot flow area 93. The first slot flow area 91 may be defined as a cross-sectional area of the first aerodynamic slot 82 (i.e. an annular area) and the second slot flow area 93 may be defined as a cross-sectional area of the second aerodynamic slot 84 (i.e. an annular area).

In the depicted dashed indication of the forward cowl component 51 in FIG. 3, it should be appreciated that this closed operating configuration may have each of the first aerodynamic slot 82 and the second aerodynamic slot 84 in a closed configuration such that neither slot is open or provides any flow area from the bypass airflow passage 56 at a fan nozzle exhaust section 76. A first open operating configuration is contemplated in which the first aerodynamic slot 82 is open. In sequential operation as discussed briefly above, the first open operating configuration is contemplated in which the first aerodynamic slot 82 is open and the second aerodynamic slot 84 is closed. Continuing with this exemplary embodiment, a second open operating configuration may be provided where the first aerodynamic slot 82 is open and the second aerodynamic slot 84 is open. This embodiment may include some synchronous opening of the second aerodynamic slot 84 with the first aerodynamic slot 82 or the first aerodynamic slot 82 may complete its opening process prior to any opening of the second aerodynamic slot 84. Such openings of this embodiment may each be referred to as sequential opening configurations. Alternatively, the first aerodynamic slot 82 and the second aerodynamic slot 84 may be opened simultaneously, for example completely simultaneously through the travel of each of the first aft cowl component 53 and the second aft cowl component 55.

As shown in FIG. 3, the first aft cowl displacement 81 may define a maximum first slot opening greater than a maximum second slot opening defined by the second aft cowl intermediate displacement 83. As used herein, the maximum first and second slot openings may respectively be defined by a distance interposed at complete displacement between points of contact or otherwise adjacent points in a closed state. The configuration described herein may be provided to maximize stiffness and minimize flutter of the downstream section 54. As discussed above, cross-sectional area of the cowl assembly 49' may generally decrease in the downstream direction, leaving less inherent stiffness to resist flutter.

Figure 4:
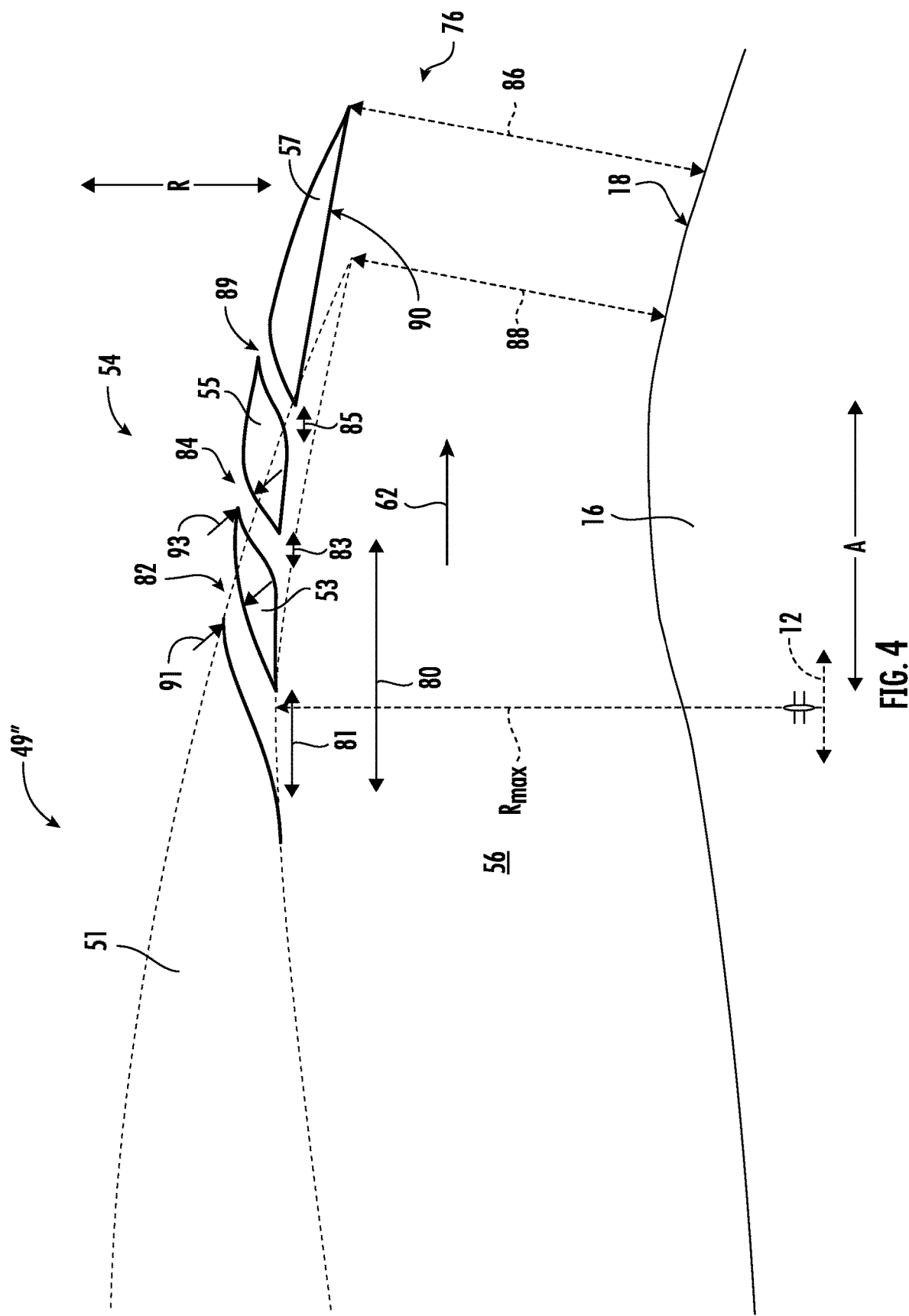
FIG. 4 is close-up schematic sectional view of a cowl assembly for a gas turbine engine according to yet another embodiment.

Turning now to FIG. 4, a close-up, sectional view of a cowl assembly 49" for a gas turbine engine, suitable for use within the turbofan engine 10 of FIG. 1, according to another embodiment is provided. The cowl assembly 49" is similar to the cowl assembly 49' of FIG. 3. Therefore, like parts will be identified with like numerals, with it being understood that the description of the like parts of the cowl assembly 49' of FIG. 3 applies to the cowl assembly 49" unless otherwise noted. As shown, it should also be appreciated that further cowl components may be provided. For example, the downstream section 54 may be provided with a third aft cowl component 57 disposed downstream of the forward cowl component 51, the first aft cowl component 53, and the second aft cowl component 55. As with the downstream section 54 discussed above, the third aft cowl component 57 may be configured to vary a third aft cowl displacement (not shown) from the forward cowl component 51, a third aft cowl first intermediate displacement (not shown) from the first aft cowl component 53, and a third aft cowl second intermediate displacement 85 from the second aft cowl component 55. It should be appreciated that any number of fourth, fifth, etc. aft cowl components (not shown) could be provided in a similar manner.

Movement of the third aft cowl component 57 aft opens and defines a third aerodynamic slot 89 disposed between the third aft cowl component 57 and the second aft cowl component 55. The third aerodynamic slot 89 may be configured in a similar manner as the first aerodynamic slot 82 and/or the second aerodynamic slot 84. In an embodiment, the third aerodynamic slot 89 defines a smaller opening or third aft cowl second intermediate displacement 85 relative to the upstream openings or intermediate displacements. It should be appreciated that a maximum opening distance may be defined based at least in part on a nacelle thickness at a given location. For example, a greater nacelle thickness may facilitate a longer displacement distance and hence effective area increase.

Additionally, it should be appreciated from FIG. 4 that various components may be defined relative to a maximum radius ($R_{max}$) of the bypass airflow passage 56. In various embodiments, at least one of the first, second, or third aerodynamic slots 82, 84, 89 may be disposed forward or upstream of the maximum radius ($R_{max}$) of the bypass airflow passage 56 and at least one of the first, second, or third aerodynamic slots 82, 84, 89 may be disposed aft or downstream of the maximum radius ($R_{max}$) of the bypass airflow passage 56. For example, the first aerodynamic slot 82 may be disposed upstream of the maximum radius ($R_{max}$) of the bypass airflow passage 56 and the second aerodynamic slot 84 may be disposed downstream of the maximum radius ($R_{max}$) of the bypass airflow passage 56.

Figure 5:
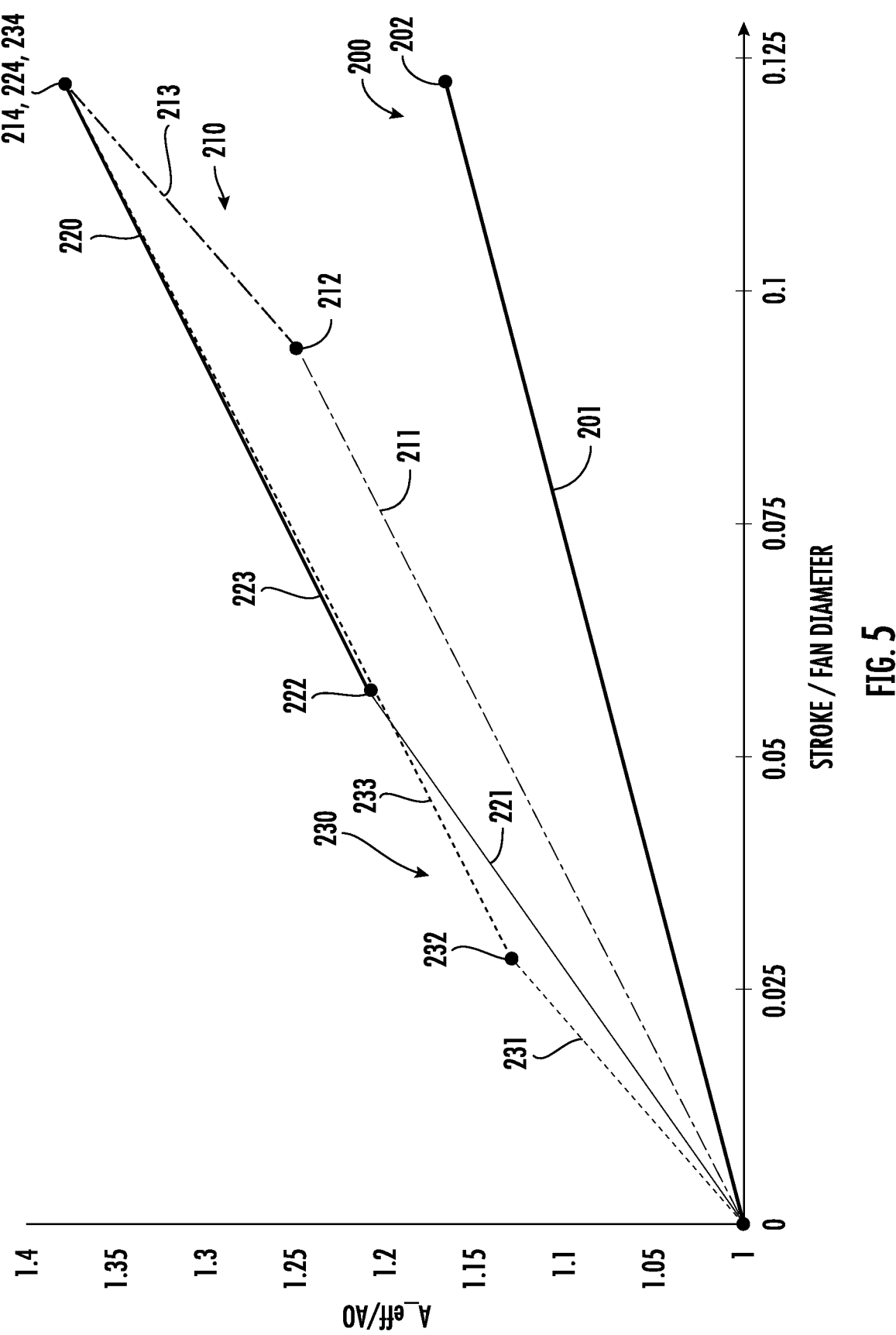
FIG. 5 is a chart depicting stroke of a cowl assembly relative to nozzle area for a gas turbine engine.

Turning now to FIG. 5, a graph is shown to plot the total stroke of a given cowl assembly against a change in effective nozzle area, where the origin of the graph represents a base or closed nozzle area at a base, closed, or zero stroke. It will be appreciated that the maximum effective nozzle area refers to an effective area of exhausting capability, for example including an aft nozzle area and one or more slotted nozzle areas. Similarly, the minimum effective nozzle area refers to similar dimensions, for example where any slotted nozzle areas are minimized or closed. It should further be appreciated that this graph may generally represent ratios identified in FIGS. 2 and 3 as described above, as well as a cowl assembly with a single variable cowl section. For example, a first curve 200 generally represents a cowl assembly with a single aft cowl section, such that an entirety of an increase in effective nozzle area is due to the movement (and stroke length) of the single variable aft cowl section. With such a configuration, a relatively long maximum stroke is required to achieve a relatively low maximum change in effective nozzle area. This relationship is represented by a first curve maximum point 202 of a first curve line 201. Notably, the first curve 200 is defined entirely by the first curve line 201 as it relies on simple translation of a single component to achieve its change. As depicted, the first curve 200 represents only actual nozzle area with the addition of a single variable aft cowl.

A second curve 210, a third curve 220, and a fourth curve 230 each depict different embodiments or different functions within the same embodiment as described above with reference to FIGS. 3 and 4. Beginning with the second curve 210, a representation of a first sequential opening is provided. A second curve first line 211 represents a movement of one of at least two downstream section components (for example an opening of the first aerodynamic slot 82 and a corresponding move to the intermediate nozzle area 87 as shown in FIG. 3). The second curve first line 211 terminates at a second curve inflection 212, representing maximum opening in this manner. As can be seen, including the change in effective nozzle area facilitated by a slot such as the first aerodynamic slot 82 in FIG. 3, a relatively short stroke may be used to achieve a relatively large increase in effective nozzle area. However, compared with the remaining (third) curve and a second curve second line 213, this second curve first line 211 represents a less-than-maximal increase in effective nozzle area per stroke. However, such a configuration may still be beneficial in certain scenarios, for example to preferentially translate stiffer components (such as the first aft cowl component 53 in FIG. 3) that are more resistant to flutter or vibration.

Continuing with the second curve 210 past its inflection 212, the second curve second line 213 represents movement of at least one further component of the downstream section, for example the second aft cowl component 55 as depicted in FIG. 3. As shown in FIG. 5, the second curve second line 213 represents sequential movement of the first component (for example at the end of its travel) and the second component (for example across all of its travel). Such an embodiment may be selected to minimize flutter overall, and can be optimized based on system harmonics, stiffness, etc. As can be seen from the second curve 210 terminating at a second curve maximum 214, it is possible for a maximum effective nozzle area to be greater than 1.25 times, for example greater than 1.3 times, for example, greater than 1.35 times a minimum effective nozzle area. As shown, it is possible to achieve these maximum effective nozzle areas with strokes, normalized to a fan diameter D (see FIG. 1; i.e., a ratio of stroke to fan diameter, each in a common unit) of less than 0.125, for example less than 0.1, for example less than 0.08.

Still referring to FIG. 5, the third curve 220 is provided, generally representing a synchronous or simultaneous opening operation. A third curve first line 221 represents a movement of at least two downstream section components (for example at least a partial opening of the first aerodynamic slot 82 and at least a partial opening of the second aerodynamic slot 84 and a corresponding move to the intermediate nozzle area 87 as shown in FIG. 3). The third curve first line 221 terminates at a third curve inflection 222, representing maximum opening in this manner. As can be seen, including the change in effective nozzle area facilitated by a combination of features such as the first aerodynamic slot 82 and the second aerodynamic slot 84 in FIG. 3, a relatively short stroke may be used to achieve a relatively large increase in effective nozzle area, even in comparison with the second curve 210 described above.

Continuing with the third curve 220 past its inflection 222, a third curve second line 223 represents movement beyond a maximum stroke of at least one component of the downstream section, for example the first aft cowl component 53 as depicted in FIG. 3. As shown in FIG. 5, the third curve second line 223 represents movement of only a second component. Such an embodiment may be selected to quickly achieve relatively high effective nozzle areas with relatively low stroke, for example to maintain a compact length and minimize undesirable vibration and noise when the variable area nozzle is deployed. As can be seen from the third curve 220 terminating at a third curve maximum 224, it is possible for the maximum effective nozzle area to be greater than 1.25 times, for example greater than 1.3 times, for example, greater than 1.35 times the minimum effective nozzle area. As shown, it is possible to achieve these maximum effective nozzle areas with strokes normalized to fan diameter D (see FIG. 1) of less than 0.125, for example less than 0.1, for example less than 0.08.

Briefly, it will be appreciated that the graph of FIG. 5 further depicts the fourth curve 230. The fourth curve 230 may represent an operation similar to the second curve 210, i.e., a sequential opening of two or more downstream section components. More specifically, the fourth curve 230 represents the same operations as the second curve 210, but in reverse order. In such a manner a fourth curve first line 231 may represent a first movement of a component corresponding to the movement at the second curve second line 213, and a fourth curve second line 233 may represent a second movement of a component corresponding to the movement indicated at the second curve first line 211. Such may yield an inflection point 232 after the first downstream component is moved providing for another control option with respect to stroke length and nozzle area ratio.

Figure 6:
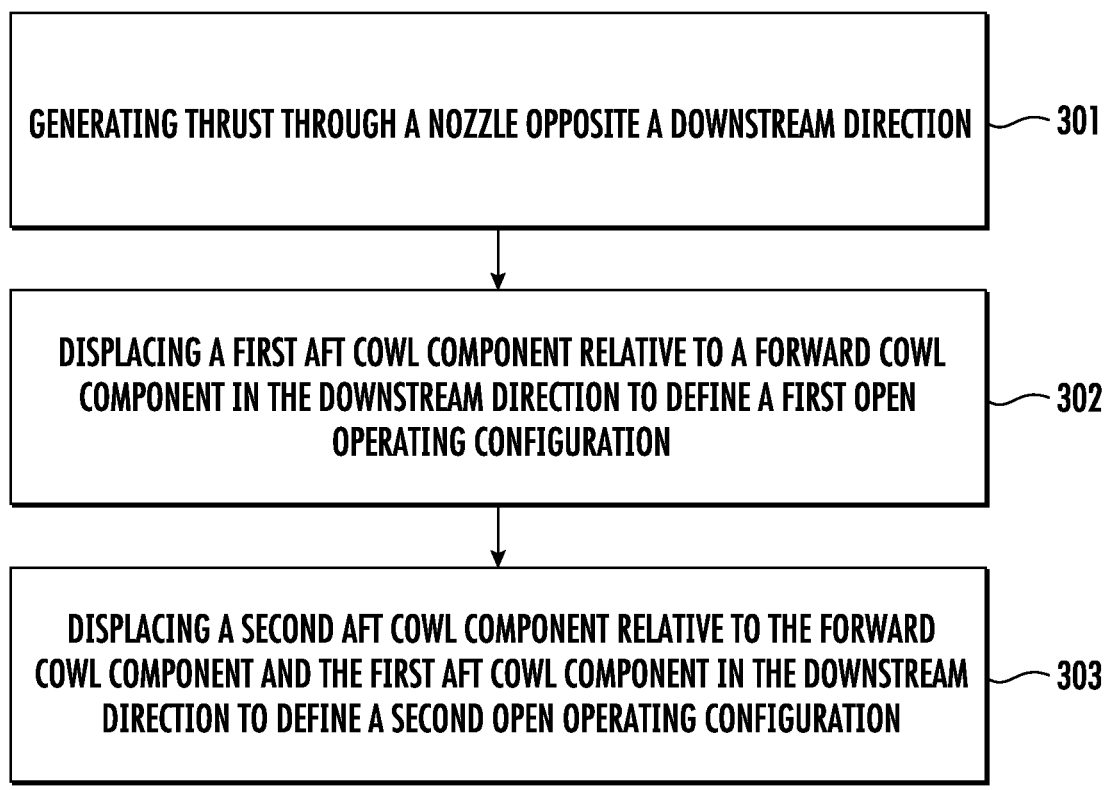
FIG. 6 is a flow chart depicting a method of operation of a cowl assembly for a gas turbine engine.

Turning now to FIG. 6, a method of operating a gas turbine engine according to the disclosure is provided. As described above, the gas turbine engine may generally have a turbomachine having a compressor section, a combustor section, and a turbine section arranged in serial flow order. In a first process 301, the method proceeds with generating thrust through a nozzle in a downstream direction. Thrust as described herein is generally provided by a fan, the turbomachine, and any further combination or addition of propulsive components. The nozzle may a be fan nozzle exhaust section as described above with reference to FIG. 3.

Still referring to FIG. 6, the method then proceeds to a second process 302 of displacing a first aft cowl component relative to a forward cowl component in the downstream direction to define a first open operating configuration. As described above with reference to FIG. 3, this process may generally be represented by movement to the intermediate nozzle area 87 described therein. Finally, the method proceeds to displacing a second aft cowl component relative to the forward cowl component and the first aft cowl component in the downstream direction to define a second open operating configuration.

It will be appreciated that although the description above discusses the present disclosure with respect to a gas turbine engine, such as a turbofan engine, having a turbomachine as a power source, in other exemplary aspects of the present disclosure, one or more of the exemplary aspects may be incorporated into any other suitable propulsor, such as an electric propulsor. With such a configuration the power source of the propulsor may not be a turbine or turbomachine, and instead may be an electric motor and electric power source.

Further, it will be appreciated that one or more of the first, second, or third aerodynamic slots 82, 84, 89 described hereinabove, the present disclosure may include additional structure to enhance a mixing of an airflow through the respective first, second, or third aerodynamic slots 82, 84, 89 and reduce, e.g., vibrations or the like.

Figure 7:
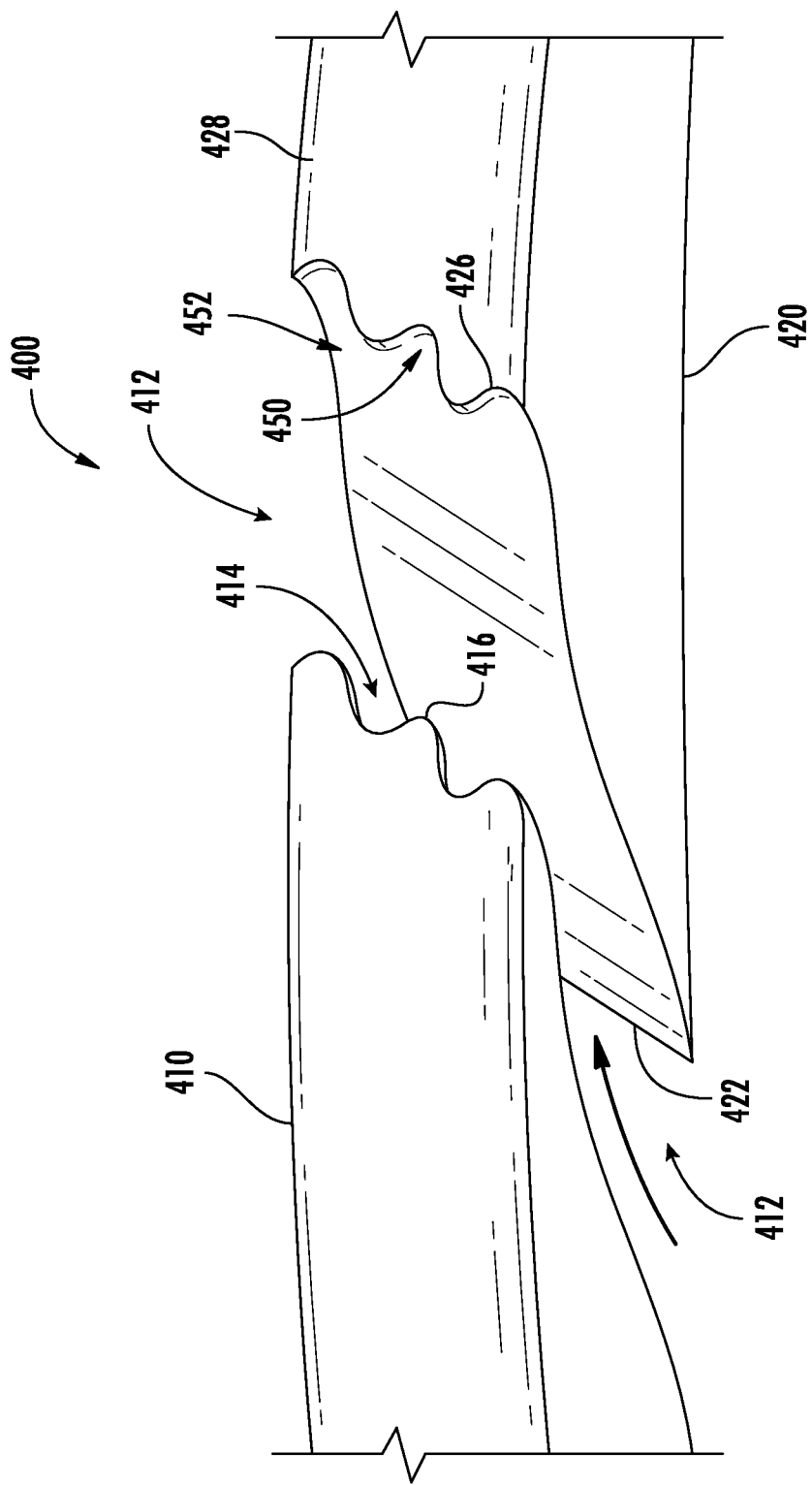
FIG. 7 is a simplified view of a cowl assembly of an aerodynamic device in accordance with an exemplary embodiment of the present disclosure.

Referring now to FIG. 7 a simplified close-up view of a cowl assembly 400 of an exhaust nozzle in accordance with another exemplary aspect of the present disclosure is provided. The exemplary cowl assembly 400 of FIG. 7 may be incorporated into one or more of the exemplary cowl assemblies 49, 49', 49" described hereinabove with reference to, e.g., FIGS. 1 through 6.

For example, the exemplary cowl assembly 400 of FIG. 7 generally includes a forward cowl component 410 and an aft cowl component 420. The forward and aft cowl components 410 and 420 together define a slot 412. The slot 412 may be one or more of the first, second, or third aerodynamic slots 82, 84, 89 described hereinabove. In such a manner, it will be appreciated that the forward cowl component 410 and aft cowl component 420 may be one or more of the cowl components 51, 53, 55, 57 described above, and that the cowl assembly 400 may include additional cowl components and aerodynamic slots not depicted.

The forward cowl component 410 generally includes a trailing edge 414 and a plurality of forward cowl indentations 416. The aft cowl component 420 generally includes an outer surface 428, a leading edge 422, and a plurality of aft cowl indentations 426 complimentary in shape to the plurality of forward cowl indentations 416. For the embodiment of FIG. 7, the aft cowl component 420 is configured to define a juncture 450 where the trailing edge 414 of the forward cowl component 410 meets the outer surface 428 of the aft cowl component 420 in the stowed position (not shown in FIG. 7). The aft cowl indentations 426 are positioned locally on the outer surface 428 of the aft cowl component 420 at the juncture 450. For example, the plurality of forward cowl indentations 416 mate with and are flush with the plurality of aft cowl indentations 426 at the juncture 450 in the stowed position (not shown in FIG. 7). More specifically, the aft cowl component 420 defines a local region 452 encompassing the juncture 450. As used herein, the term "local region" with respect to indentations, such as aft cowl indentations 426, refers to an area that is non-uniform in a direction along a surface of the cowl assembly (such as in a circumferential direction along the outer surface 428 of the aft cowl component 420 in the embodiment shown) that is adjacent to the juncture 450 and that further defines a mating surface for complementary cowl indentations on an opposing cowl (e.g., the plurality of forward cowl indentations 426 in the embodiment shown). Notably, in other embodiments, such as the embodiment of FIGS. 8 and 9 described below, the term local region with respect to indentations refers to an area that is non-uniform in a spanwise direction along a surface of the cowl assembly that is adjacent to the juncture and that further defines a mating surface for complementary cowl indentations on an opposing cowl.

During an operating condition of a gas turbine engine (e.g., turbofan engine 10 of FIG. 1), the forward cowl component 410 and the aft cowl component 420 may be moveable to open the slot 412 to the deployed position. As discussed previously, by opening the slot 412, flow output through the gas turbine engine is able to exit through the slot 412. As the flow output passes by the trailing edge 414 of the forward cowl component 410, oscillating or fluctuating flow shear layers may form. These shear layers may impinge on the aft cowl component 420 causing noise and vibration. The plurality of forward cowl indentations 416 may feature a smooth sweep that is operable to disrupt the shedding and decorrelate the vortices that may impinge on the aft cowl component 420. In the exemplary embodiment of FIG. 7, the plurality of forward cowl indentations 416 and the complementary plurality of aft cowl indentations 426 are scallops.

It will be appreciated that the exemplary plurality of forward cowl indentations 416 and the plurality of aft cowl indentations 426 of FIG. 7 are provided by way of example only, and that in other exemplary embodiments any other suitable plurality of forward cowl indentations 416 and plurality of aft cowl indentations 426 may be provided. For example, although the exemplary plurality of forward cowl indentations 416 and plurality of aft cowl indentations 426 feature a smooth transition in the form of scallops, in other exemplary embodiments of the present disclosure the plurality of forward cowl indentations 416 and the plurality of aft cowl indentations 426 may not include a smooth transition and may be at least one of a step (see, e.g., FIG. 8, below), a wire (e.g., a plurality of wires spaced along a length of the opening defining indentations), a fence (e.g., a separate structure attached to the forward and/or aft cowl to form the indentations), a rib (e.g., protrusions extending from a surface of the forward and/or aft cowl to define the indentations), a groove (e.g., grooves formed in a surface of the forward and/or aft cowl to form the indentations), a chevron, a scalloped waveform, a tab, a tubercle, or any suitable combination thereof. Additionally, or alternatively, although the exemplary plurality of forward cowl indentations 416 and the plurality of aft cowl indentations 426 are depicted as features with a smooth sweep, in other exemplary embodiments the plurality of forward cowl indentations 416 and the plurality of aft cowl indentations 426 may alternatively utilize a rigid transition with a yaw in a circumferential direction of the cowl assembly 400, as described below.

Further, it should be appreciated that in other exemplary embodiments the plurality of forward cowl indentations 416 and the plurality of aft cowl indentations 426 may additionally or alternatively include an embedded acoustic liner (not shown). The embedded acoustic liner may be configured to attenuate noise generated by vortices that may impinge on the aft cowl component 420 of the cowl assembly 400. The embedded acoustic liner may be embedded in the plurality of aft cowl indentations 426, in between the plurality of aft cowl indentations 426, in the plurality of forward cowl indentations 416, in between the plurality of forward cowl indentations 416, or a combination thereof. Additionally, or alternatively, in alternative exemplary embodiments the plurality of forward cowl indentation 416 and the plurality of aft cowl indentations 426 may include a porous structure. The porous structure may be configured to attenuate noise generated by the vortices that may impinge on the aft cowl component 420 of the cowl assembly 400.

Figure 8:
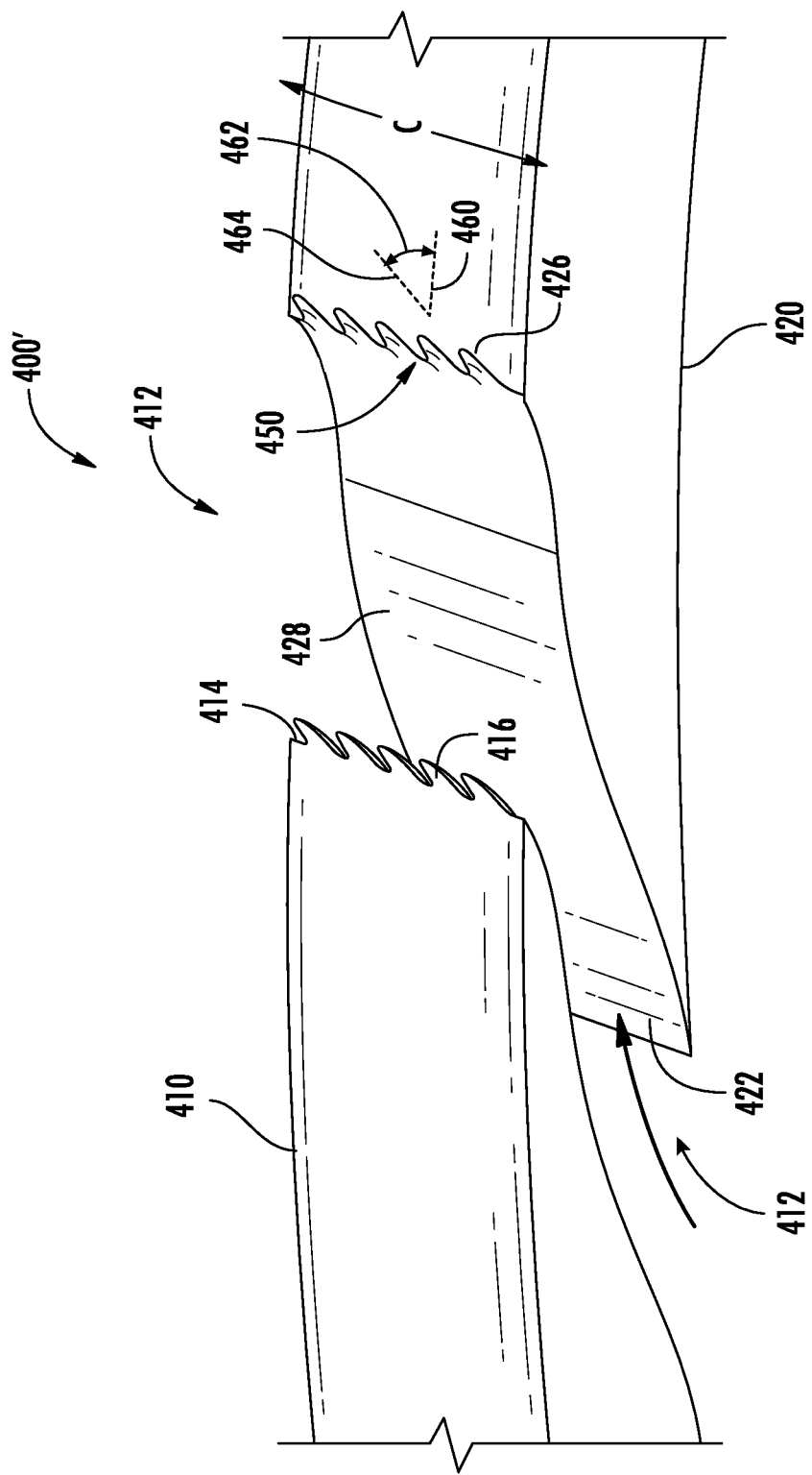
FIG. 8 is a simplified view of a cowl assembly of an aerodynamic device in accordance with another exemplary embodiment of the present disclosure.

Referring now to FIG. 8, a simplified view of a cowl assembly 400' for a gas turbine engine (e.g., turbofan engine 10 of FIG. 1), in accordance with another exemplary aspect of the present disclosure is provided. The exemplary cowl assembly 400' of FIG. 8 may be configured in substantially the same manner as the exemplary cowl assembly 400 of FIG. 7, and accordingly, the same or similar numbers may refer to the same or similar parts.

For example, the exemplary cowl assembly 400' of FIG. 8 generally includes a forward cowl component 410 and an aft cowl component 420. The forward cowl component 410 generally includes a plurality of forward cowl indentations 416, and the aft cowl component 420 generally includes a plurality of aft cowl indentations 426 complementary in shape to the plurality of forward cowl indentations 416. Further, the aft cowl component 420 defines a juncture 450 where the trailing edge 414 of the forward cowl component 410 meets the outer surface 428 of the aft cowl component 420 when in the stowed position (now shown in FIG. 8). However, for the embodiment of FIG. 8 the cowl assembly 400' defines a circumferential direction C and the plurality of forward cowl indentations 416 have a yaw in the circumferential direction C and the complementary plurality of aft cowl indentations 426 have a complementary yaw. It should be appreciated that the plurality of forward cowl indentations 416 and the complementary plurality of aft cowl indentations 426 are configured as steps. In such a manner the term "steps" as used herein to refer to indentations that have the yaw in the circumferential direction C. In particular, with reference to the aft cowl indentations 426, the aft cowl indentations 426 extend in a first direction 464 that defines an angle 462 relative to a reference line 460 (the reference line 460 being parallel to the axial direction A of the gas turbine engine). More specifically, the angle 462 is defined in a reference plane that is in turn defined by a tangent to the circumferential direction C and the axial direction A.

The yaw of the plurality of aft cowl indentations 426 in the circumferential direction C may decorrelate the vortices that may impinge on the aft cowl component 420 while the cowl assembly 400' is in the deployed position (shown). Additionally, in the stowed position the plurality of forward cowl indentations 416 mate with and are flush with the plurality of aft cowl indentations 426 at the juncture 450.

Figure 9:
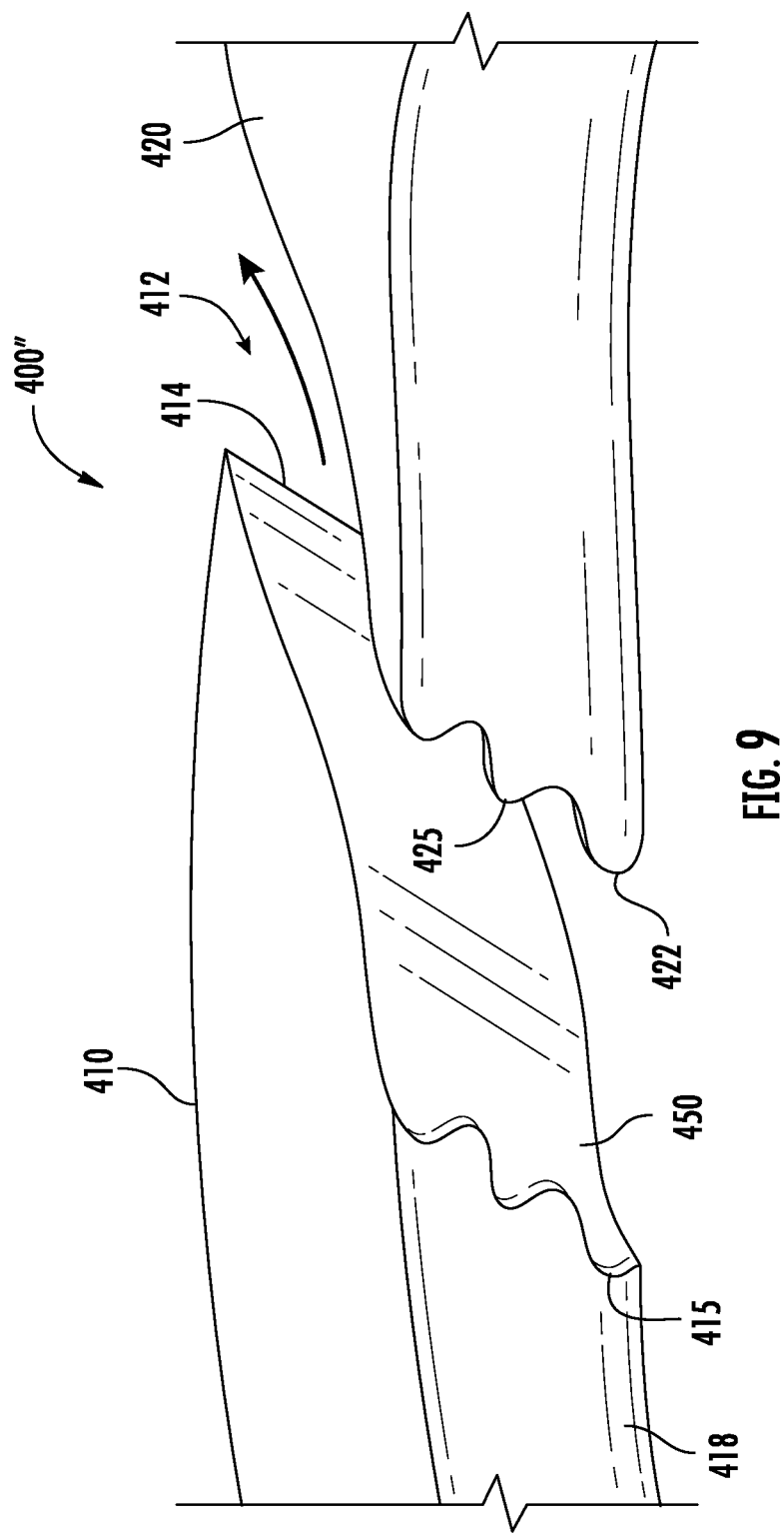
FIG. 9 is a simplified view of a cowl assembly of an aerodynamic device in accordance with yet another exemplary embodiment of the present disclosure.

Referring now to FIG. 9, a simplified view of a cowl assembly 400" for a gas turbine engine (e.g., turbofan engine 10 of FIG. 1), in accordance with another exemplary aspect of the present disclosure is provided. The exemplary cowl assembly 400" may be configured in substantially the same manner as the exemplary cowl assemblies 400, 400' of FIGS. 4 and 5, and accordingly the same or similar numbers may refer to the same or similar parts.

For example, the exemplary cowl assembly 400" of FIG. 9 generally includes a forward cowl component 410 and an aft cowl component 420. The aft cowl component 420 generally defines a leading edge 422. However, for the embodiment of FIG. 9, the forward cowl component 410 further defines an inner surface 418 and a juncture 450. The juncture 450 is where the leading edge 422 of the aft cowl component 420 meets the inner surface 418 of the forward cowl component 410 when in the stowed position. Further, the forward cowl component 410 includes a plurality of forward cowl indentations 415 positioned locally on the inner surface 418 of the forward cowl component 410 at the juncture 450. Additionally, the aft cowl component 420 includes a plurality of aft cowl indentations 425 at the leading edge 422 of the aft cowl component 420. The plurality of forward cowl indentations 415 are complementary in shape with the plurality of aft cowl indentations 425.

Inclusion of the plurality of aft cowl indentations 425 on the leading edge 422 of the aft cowl component 420 may decorrelate the unsteady pressure generated by the vortices through the slot 412 and over the trailing edge 414 of the forward cowl component 410 that may impinge on one or more downstream structures, reducing the amount of noise and vibration generated.

Further aspects are provided by the subject matter of the following clauses:

A propulsor comprising: a power source; a fan section coupled to the power source and configured to provide thrust opposite a downstream direction; and a cowl assembly at least partially enclosing the power source and the fan section, the cowl assembly comprising: a forward cowl component; a first aft cowl component disposed in the downstream direction relative to the forward cowl component and movable to vary a first aft cowl displacement from the forward cowl component in the downstream direction; and a second aft cowl component disposed in the downstream direction relative to the first aft cowl component and movable to vary a second aft cowl displacement from the forward cowl component and a second aft cowl intermediate displacement from the first aft cowl component.

The propulsor of the preceding clause, wherein the cowl assembly defines: a first aerodynamic slot between the forward cowl component and the first aft cowl component, wherein the first aerodynamic slot is open in at least one operating configuration; and a second aerodynamic slot between the first aft cowl component and the second aft cowl component, wherein the second aerodynamic slot is open in at least one operating configuration, wherein in a closed operating configuration, neither the first aerodynamic slot nor the second aerodynamic slot is open.

The propulsor of any preceding clause, wherein in a first open operating configuration the first aerodynamic slot is closed between the forward cowl component and the first aft cowl component and the second aerodynamic slot is open between the first aft cowl component and the second aft cowl component.

The propulsor of any preceding clause, wherein in a second open operating configuration the first aerodynamic slot is open between the forward cowl component and the first aft cowl component and the second aerodynamic slot is open between the first aft cowl component and the second aft cowl component.

The propulsor of any preceding clause, wherein the first aerodynamic slot and the second aerodynamic slot are configured to open simultaneously.

The propulsor of any preceding clause, wherein the first aerodynamic slot and the second aerodynamic slot are configured to open sequentially.

The turbofan engine of any preceding clause, wherein the first aerodynamic slot is configured to begin opening after the second aerodynamic slot.

The turbofan engine of any preceding clause, wherein the first aerodynamic slot defines a maximum first slot opening and the second aerodynamic slot defines a maximum second slot opening, wherein the maximum first slot opening is greater than the maximum second slot opening.

The propulsor of any preceding clause, wherein the cowl assembly further comprises: a third aft cowl component disposed in the downstream direction relative to the forward cowl component, the first aft cowl component, and the second aft cowl component, wherein the third aft cowl component is configured to vary a third aft cowl second intermediate displacement from the second aft cowl component.

The propulsor of any preceding clause, wherein: the first aft cowl displacement is defined between a minimum first aft cowl stroke and a maximum first aft cowl stroke; the second aft cowl intermediate displacement is defined between a minimum second aft cowl stroke and a maximum second aft cowl stroke; a minimum effective nozzle area is defined by a first nozzle area of the cowl assembly defined in such configuration when all slots are at their respective minimum strokes; and a maximum effective nozzle area is defined by a combination of the first aerodynamic slot when the first aft cowl component is at the maximum first aft cowl stroke, the second aerodynamic slot when the second aft cowl component is at the maximum second aft cowl stroke, and a second nozzle area of the cowl assembly defined in such configuration.

The propulsor of any preceding clause, wherein the maximum effective nozzle area is at least 1.3 times greater than the minimum effective nozzle area.

The propulsor of any preceding clause, wherein the power source is a turbine engine.

A method of operating a propulsor, the method comprising: generating thrust through a nozzle in a downstream direction with a fan section coupled to a power source; displacing a first aft cowl component relative to a forward cowl component in the downstream direction to define a first open operating configuration; and displacing a second aft cowl component in the downstream direction relative to the forward cowl component and the first aft cowl component to define a second open operating configuration.

The method of the preceding clause, wherein displacing the first aft cowl component comprises: opening a first aerodynamic slot defined between the forward cowl component and the first aft cowl component in at least one operating configuration; and wherein displacing the second aft cowl component comprises: opening a second aerodynamic slot defined between the first aft cowl component and the second aft cowl component in at least one operating configuration, wherein in a closed operating configuration, neither the first aerodynamic slot nor the second aerodynamic slot is open.

The method of any preceding clause, wherein displacing the first aft cowl component further comprises: opening the first aerodynamic slot in a first open operating configuration; and wherein displacing the second aft cowl component further comprises: opening the second aerodynamic slot in the second open operating configuration.

The method of any preceding clause, wherein the second aerodynamic slot is closed in the first open operating configuration.

The method of any preceding clause, wherein the second aerodynamic slot is partially open in the first open operating configuration.

The method of any preceding clause, wherein the first aerodynamic slot defines a first maximum slot opening and the second aerodynamic slot defines a second maximum slot opening, wherein the first maximum slot opening is greater than the second maximum slot opening.

The method of any preceding clause, further comprising: displacing a third aft cowl component in the downstream direction relative to the forward cowl component, the first aft cowl component, and the second aft cowl component to define a third open operating configuration.

The method of any preceding clause, wherein the maximum effective nozzle area is at least 1.3 times greater than the minimum effective nozzle area.

The propulsor of any preceding clause, wherein the cowl assembly defines at least in part an airflow stream, the cowl assembly comprising a first cowl and a second cowl moveable relative to the first cowl, wherein the first cowl is one of the forward or aft cowl component and wherein the second cowl is the other of the forward or aft cowl component, the first cowl comprising a plurality of first cowl indentations at an end of the first cowl, the second cowl defining an outer surface along a thickness direction and an inner surface along the thickness direction, the second cowl comprising a plurality of second cowl indentations at an end of the second cowl, the plurality of second cowl indentations being complementary in shape to the plurality of first cowl indentations, wherein the plurality of second cowl indentations are positioned locally on the outer surface of the second cowl or locally on the inner surface of the second cowl.

The propulsor of any preceding clause, wherein the propulsor comprises a fan defining a fan diameter, wherein the cowl assembly defines a maximum effective nozzle area greater than 1.25 times the minimum effective nozzle area with a stroke normalized to fan diameter of less than 0.125

The propulsor of any preceding clause, wherein the cowl assembly defines a maximum effective nozzle area greater than 1.25 times the minimum effective nozzle area with a stroke normalized to fan diameter of less than 0.1.

The propulsor of any preceding clause, wherein the cowl assembly defines a maximum effective nozzle area greater than 1.25 times the minimum effective nozzle area with a stroke normalized to fan diameter of less than 0.08.

The propulsor of any preceding clause, wherein the propulsor comprises a fan defining a fan diameter, wherein the cowl assembly defines a maximum effective nozzle area greater than 1.35 times the minimum effective nozzle area with a stroke normalized to fan diameter of less than 0.125.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A propulsor comprising:
   a power source;
   a fan section coupled to the power source and configured to provide thrust opposite a downstream direction; and
   a cowl assembly at least partially enclosing the power source and the fan section, the cowl assembly comprising:
   a forward cowl component;
   a first aft cowl component disposed in the downstream direction relative to the forward cowl component and movable to vary a first aft cowl displacement from the forward cowl component in the downstream direction;
   a second aft cowl component disposed in the downstream direction relative to the first aft cowl component and movable to vary a second aft cowl intermediate displacement from the first aft cowl component;
   a third aft cowl component disposed in the downstream direction relative to the forward cowl component, the first aft cowl component, and the second aft cowl component;
   a first aerodynamic slot between the forward cowl component and the first aft cowl component, wherein the first aerodynamic slot is open in at least one operating configuration; and
   a second aerodynamic slot between the first aft cowl component and the second aft cowl component, wherein the second aerodynamic slot is open in at least one operating configuration, wherein in a closed operating configuration, neither the first aerodynamic slot nor the second aerodynamic slot is open, and wherein in a first open operating configuration the first aerodynamic slot is closed and the second aerodynamic slot is open.

2. The propulsor of claim 1, wherein in a second open operating configuration the first aerodynamic slot is open and the second aerodynamic slot is open.

3. The propulsor of claim 1, wherein the first aerodynamic slot and the second aerodynamic slot are configured to open simultaneously.

4. The propulsor of claim 1, wherein the first aerodynamic slot and the second aerodynamic slot are configured to open sequentially.

5. The propulsor of claim 4, wherein the first aerodynamic slot is configured to begin opening after the second aerodynamic slot.

6. The propulsor of claim 1, wherein the first aerodynamic slot defines a maximum first slot opening and the second aerodynamic slot defines a maximum second slot opening, wherein the maximum first slot opening is greater than the maximum second slot opening.

7. The propulsor of claim 1, wherein the third aft cowl component is configured to vary a third aft cowl second intermediate displacement from the second aft cowl component, wherein the cowl assembly further defines a third aerodynamic slot between the second aft cowl component and the third aft cowl component, wherein the third aerodynamic slot is open in at least one operating configuration, wherein the third aerodynamic slot defines a smaller opening than the first aerodynamic slot.

8. The propulsor of claim 1, wherein:
   the first aft cowl displacement is defined between a minimum first aft cowl stroke and a maximum first aft cowl stroke;
   the second aft cowl intermediate displacement is defined between a minimum second aft cowl stroke and a maximum second aft cowl stroke;
   a minimum effective nozzle area is defined by a first nozzle area of the cowl assembly defined in such configuration when all slots are at their respective minimum strokes; and
   a maximum effective nozzle area is defined by a combination of the first aerodynamic slot when the first aft cowl component is at the maximum first aft cowl stroke, the second aerodynamic slot when the second aft cowl component is at the maximum second aft cowl stroke, and a second nozzle area of the cowl assembly defined in such configuration.

9. The propulsor of claim 8, wherein the maximum effective nozzle area is at least 1.3 times greater than the minimum effective nozzle area.

10. The propulsor of claim 1, wherein the power source is a turbine engine.

11. A propulsor comprising:
    a power source;
    a fan section coupled to the power source and configured to provide thrust opposite a downstream direction; and
    a cowl assembly at least partially enclosing the power source and the fan section, the cowl assembly comprising:
    a forward cowl component;
    a first aft cowl component disposed in the downstream direction relative to the forward cowl component and movable to vary a first aft cowl displacement from the forward cowl component in the downstream direction;
    a second aft cowl component disposed in the downstream direction relative to the first aft cowl component and movable to vary a second aft cowl intermediate displacement from the first aft cowl component;
    a third aft cowl component disposed in the downstream direction relative to the forward cowl component, the first aft cowl component, and the second aft cowl component;
    a first aerodynamic slot between the forward cowl component and the first aft cowl component, wherein the first aerodynamic slot is open in at least one operating configuration; and
    a second aerodynamic slot between the first aft cowl component and the second aft cowl component, wherein the second aerodynamic slot is open in at least one operating configuration, wherein in a closed operating configuration, neither the first aerodynamic slot nor the second aerodynamic slot is open, wherein the first aerodynamic slot and the second aerodynamic slot are configured to open sequentially, and wherein the first aerodynamic slot is configured to begin opening after the second aerodynamic slot.

\* \* \* \* \*